C. W. F. KOCH & U. G. SHULER.
GRAIN CAR DOOR.
APPLICATION FILED JUNE 7, 1912.

1,125,344.

Patented Jan. 19, 1915.

2 SHEETS—SHEET 1.

Witnesses

Inventors
C. W. F. Koch.
U. G. Shuler.

By

Attorneys

C. W. F. KOCH & U. G. SHULER.
GRAIN CAR DOOR.
APPLICATION FILED JUNE 7, 1912.
1,125,344.
Patented Jan. 19, 1915.
2 SHEETS—SHEET 2.
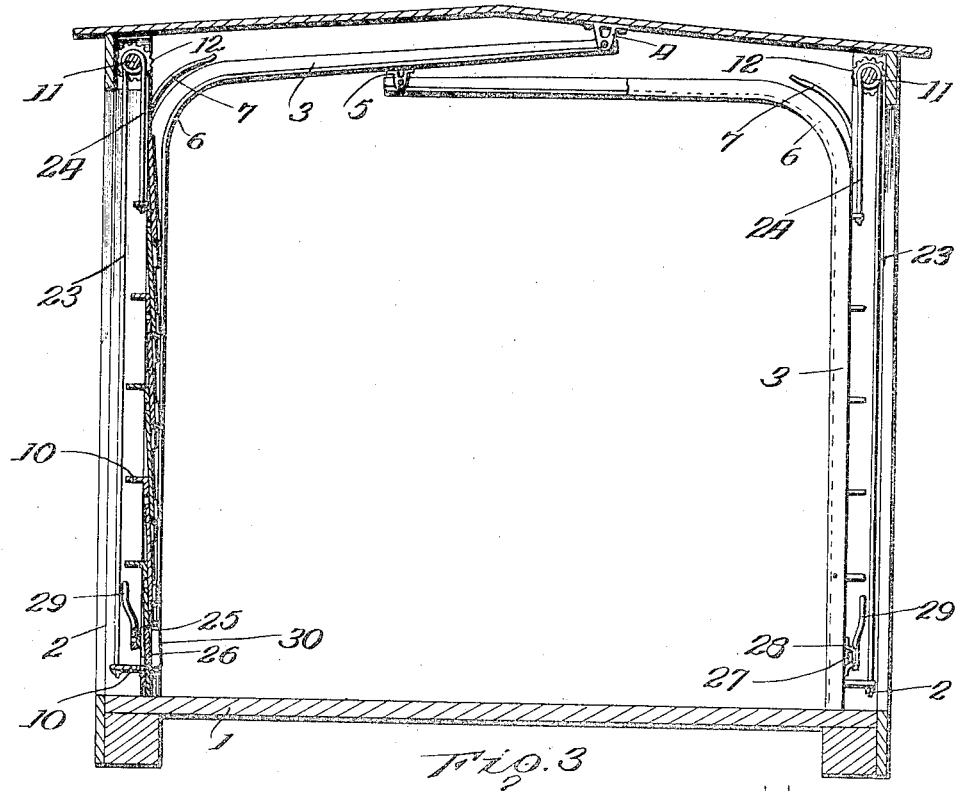
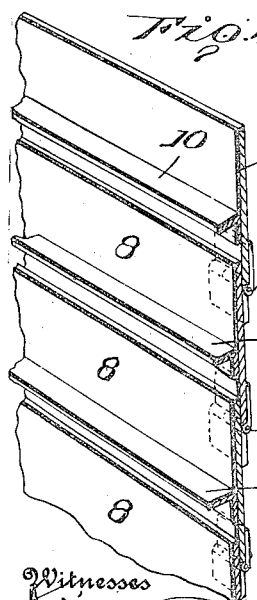
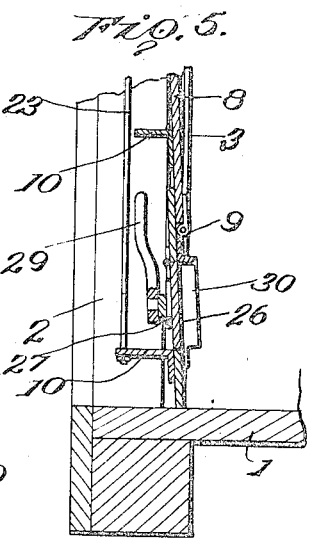
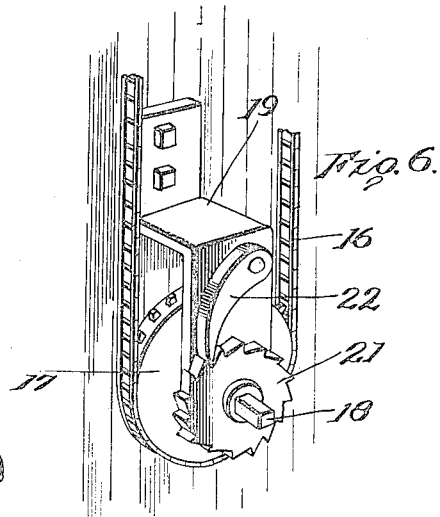
Inventors
C. W. F. Koch.
U. G. Shuler.

UNITED STATES PATENT OFFICE.

CHARLES W. F. KOCH AND ULYSSES G. SHULER, OF DECATUR, ILLINOIS.

GRAIN-CAR DOOR.

1,125,344.   Specification of Letters Patent.   Patented Jan. 19, 1915.

Application filed June 7, 1912. Serial No. 702,323.

*To all whom it may concern:*

Be it known that we, CHARLES W. F. KOCH and ULYSSES GRANT SHULER, citizens of the United States, residing at Decatur, in the county of Macon and State of Illinois, have invented certain new and useful Improvements in Grain-Car Doors, of which the following is a specification.

Our invention relates to grain car doors, and has for its object the provision of an easily operated door by which the escape of grain will be effectually prevented; also to provide a door which may be readily brought to the open or closed position and which will occupy very little space in either position.

The invention is fully illustrated in the accompanying drawings and will be hereinafter fully described, the novel features being subsequently pointed out in the claims following the description.

Figure 1:
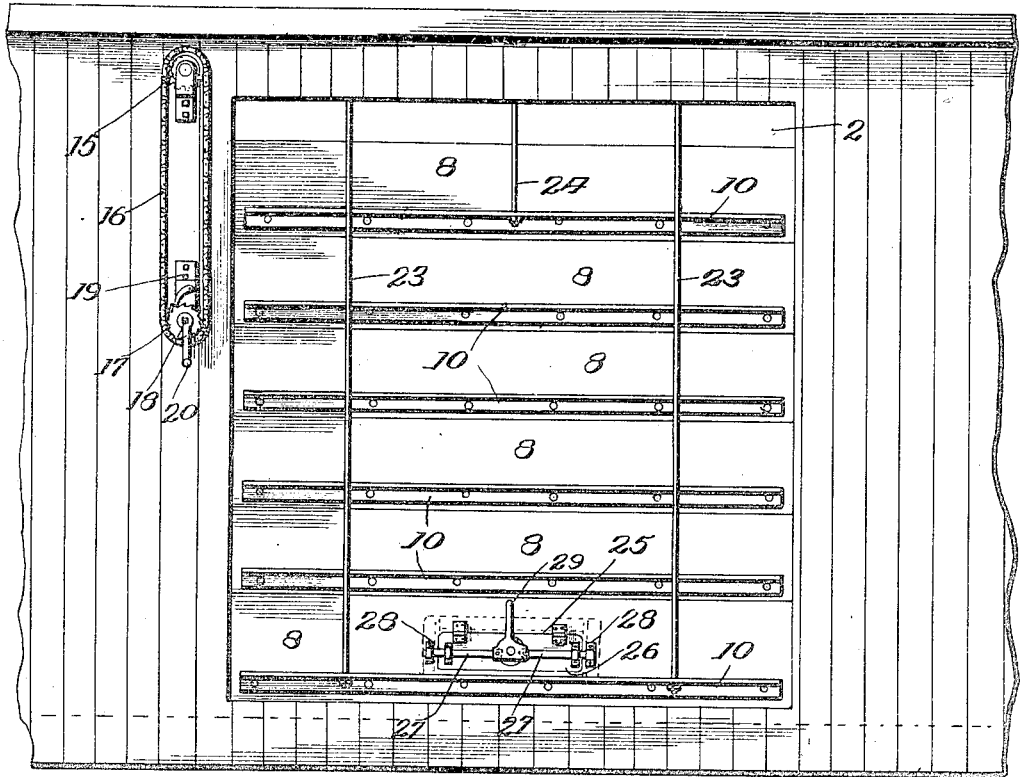
Figure 2:
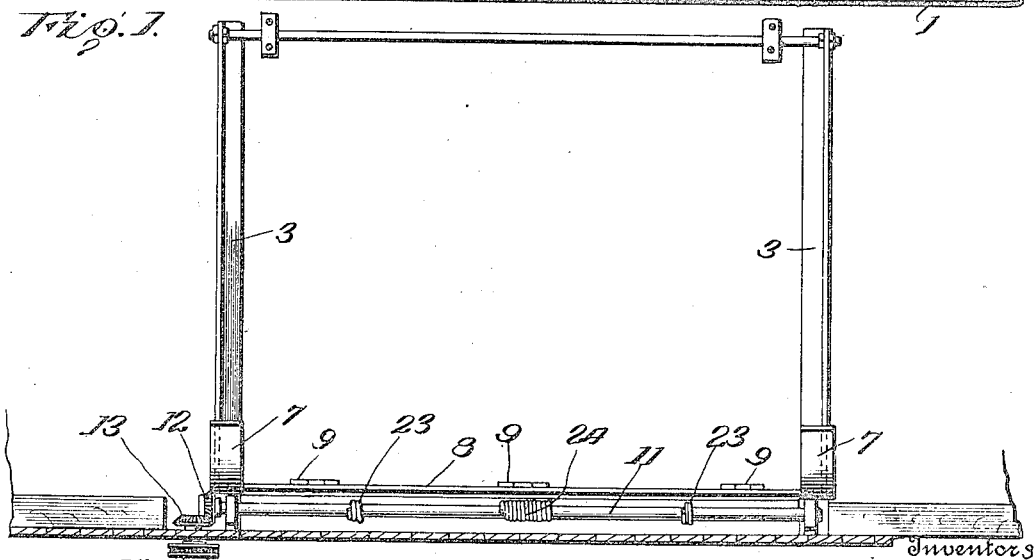

In the drawings:—Figure 1 is a side elevation of our improved door showing the position of the same, relative to a car, when closed; Fig. 2 is a plan view of the same; Fig. 3 is a transverse section of a car equipped with our improved door; Fig. 4 is an enlarged detail sectional perspective of a portion of the door; Fig. 5 is a detail section through the lower portion of the door; Fig. 6 is a detail perspective of part of the operating mechanism.

The car, indicated at 1, may be of the usual construction and is provided in its sides with door openings 2, as will be readily understood.

In carrying out our invention, we secure to the inner face of the side walls of the car, immediately adjacent the sides of the door openings, tracks consisting of angle irons 3 extending from the bottom of the car to points near the roof of the same and being then turned inwardly transversely to the car, the tracks from the opposite sides being arranged to overlap, as shown clearly in Fig. 3, so that, when either door is in its open or raised position, it will not engage the tracks for the other door and be obstructed in its movements thereby. The upper track is secured to the roof of the car by means of brackets or hangers 4, and the lower track is supported from the upper track by similar brackets or hangers 5.

The angle irons constituting the tracks are so disposed that one flange will extend parallel with the inner face of the post defining the sides of the door opening, while the other flange of the track will extend at a right angle toward the said post, the two flanges thus defining a space in which the door may move and serving also to hold the door to the door post, so that leakage around the edges of the door cannot occur. The upper transversely disposed portions of the tracks, furthermore, constitute supports upon which the doors rest in their raised or open positions.

Secured upon the door posts, immediately adjacent the bends 6 of the tracks and approximately concentric therewith, are resilient deflectors 7 which serve to hold the doors to the turns in the tracks and thereby change the direction of movement of the same in both the opening and the closing operation.

The door consists of a series of metallic panels 8 having their ends engaging the tracks and having their meeting longitudinal edges connected by hinges 9 whereby flexibility is imparted to the door, which will readily conform to the shape of the track and move around the bend therein. The hinges 9 may be disposed so as to connect the edges of the panels or plates 8 directly, but, in order to further guard against leakage, we prefer to arrange the plates in overlapping relation so that the upper edge of one plate will project slightly above the lower edge of the next adjacent plate and thereby prevent the formation of any cracks through which grain might escape. The said plates are reinforced by angle irons 10 riveted to their outer faces and extending between the ends of the plates, so that any tendency of the plates to buckle under the pressure of the grain will be effectually resisted.

The reinforcing members or angle irons 10 are preferably made of gradually increasing size from the top of the door to the bottom of the same so as to provide greater strength where the greater pressure exists, and consequently add to the efficiency of the door.

Mounted in the frame of the car, immediately above the door opening, is a shaft 11 having a bevel pinion 12 at one end, which meshes with a similar pinion 13 on the inner end of a short shaft 14 which is journaled in the wall of the car and equipped with a sprocket pinion 15 on its outer end. A sprocket chain 16 passes around this pinion 15 and a similar sprocket pinion 17 mounted on the car body at a point which may be deemed most convenient, the said sprocket pinion 17 being fixed upon a shaft 18 which is journaled in the car body, and in a bracket 19 secured thereto and equipped with an operating handle 20, as will be readily understood. A ratchet wheel 21 is also provided on the shaft 18, and a pawl 22 is mounted upon the bracket 19 to engage the said ratchet wheel and thereby hold the door at any desired height.

Secured to the shaft 11 are flexible elements preferably in the form of cables or chains 23 and 24 which are adapted to wind upon the shaft in opposite directions. The cable or chain 24 is secured to the angle iron 10 of the uppermost panel of the door, while the cable 23 is secured to the angle iron of the lowermost panel of the door. It will thus be seen that as one cable winds on the shaft the other cable will unwind therefrom and consequently the door may be opened or closed accordingly as the shaft is rotated in one or the other direction.

The lowermost panel has an opening 25 formed therein, and a gate 26 is hinged to the outer face of this panel in position to cover or fit into the said opening, as clearly shown in Fig. 1, a pair of bolts 27 being mounted upon the said gate in position to engage keepers 28 on the panel adjacent the ends of the gate whereby to hold the gate in its closed position. These bolts 27 are connected to a handle or lever 29 which is fulcrumed upon the gate between the inner ends of the bolts, so that, by vibrating the lever, the bolts will be simultaneously projected into engagement with the keepers 28 or withdrawn therefrom.

It will be readily seen from the foregoing description, taken in connection with the accompanying drawings, that we have provided an exceedingly simple car door which may be easily operated and which occupies very little space, so that there is no diminution in the capacity of the car by reason of the application of our door thereto. The angle irons, constituting the tracks and guiding supports for the door, fit around the edges of the same so as to effectually exclude the grain therefrom, and consequently prevent the leakage of grain at these points. The gate in the lowest panel of the door may be opened when it is desired to unload the car, so that some of the grain may flow through the opening normally covered by the gate and the pressure on the door thereby relieved sufficiently to permit the door to be easily raised. The door lies entirely within the lines of the car, so that there is no liability of any part of the door being struck by objects close to the track over which the car travels and being thereby injured.

The resilient guides 7 disposed adjacent the bends of the tracks will effectually guide the successive panels of the door around the said bend, but, at the same time, will yield to the said panels sufficiently to prevent excessive friction and wear, so that our door may be used for a long period of time without requiring any renewal.

What we claim is:

1. The combination with a car having a door opening, of a door slidably mounted against the inner face of the car at said door opening and formed of a series of hingedly connected panels, reinforcing members secured to the outer faces of said panels and projecting within the door opening, said reinforcing members gradually decreasing in width from the bottom of the door to the top thereof, an operating device arranged within the door opening, and flexible elements carried by the operating device and connected with the reinforcing member of the upper and lower panels, respectively.

2. The combination with a car having a door opening, of a door slidably mounted on the inner face of the car at said door opening and formed of a series of hingedly connected panels, reinforcing members secured to the outer faces of said panels and gradually decreasing in width from the bottom of the door to the top thereof, an operating shaft arranged above the top of the door and journaled in the walls of the door receiving opening, and a plurality of flexible elements adapted to wind upon said shaft in opposite directions, one of said flexible elements being secured to the reinforcing member of the uppermost panel and another flexible element being secured to the reinforcing member of the lowermost panel, said reinforcing members, shaft and flexible elements being disposed entirely within the lines of the door receiving opening.

3. The combination with a car having a door opening, of a track arranged within the car at said door opening, a door slidably mounted on the track and formed of a series of hingedly connected panels, reinforcing members secured to the panels and projecting within the door opening, said reinforcing members gradually decreasing in width from the bottom of the door to the top thereof, an operating shaft arranged above the door and journaled in the walls of the door opening, and flexible elements adapted to wind upon the shaft in opposite directions and connected with the reinforcing members of the upper and lowermost panels, respectively, said flexible elements being extended downwardly in a straight line from the operating shaft to the reinforcing members and disposed entirely within the lines of the door opening.

4. The combination with a car having a door opening, of a door slidably mounted on the inner face of the car at said door opening and provided with reinforcing members, each having a longitudinally disposed flange projecting within the door opening, the flanges of the reinforcing members gradually decreasing in width from the bottom of the door to the top thereof, an operating shaft journaled between the walls of the door opening, a plurality of flexible elements adapted to wind upon said shafts in opposite directions, one of said flexible elements being extended downwardly in a straight line for connection with the flange of the reinforcing member of the uppermost panel and the other flexible element being extended downwardly in a straight line for connection with the horizontal flange of the reinforcing member of the lowermost panel, and means disposed on the exterior of the car and operatively connected with the shaft for rotating the latter to open and close the door, said flanges and flexible elements being disposed entirely within the lines of the door opening.

In testimony whereof we affix our signatures in presence of two witnesses.

CHARLES W. F. KOCH. [L. S.]
ULYSSES G. SHULER. [L. S.]

Witnesses:
L. M. BANNING,
W. A. WALLENDER.